(12) United States Patent
Yang

(10) Patent No.: US 11,240,782 B2
(45) Date of Patent: Feb. 1, 2022

(54) INDICATION METHOD FOR CONTEXT IDENTIFICATION, ACQUISITION METHOD, USER EQUIPMENT AND BASE STATION

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/755,385

(22) PCT Filed: Oct. 31, 2017

(86) PCT No.: PCT/CN2017/108648
§ 371 (c)(1),
(2) Date: Apr. 10, 2020

(87) PCT Pub. No.: WO2019/084790
PCT Pub. Date: May 9, 2019

(65) Prior Publication Data
US 2021/0212019 A1 Jul. 8, 2021

(51) Int. Cl.
*H04W 68/02* (2009.01)
*H04W 76/27* (2018.01)
(Continued)

(52) U.S. Cl.
CPC ......... *H04W 68/02* (2013.01); *H04W 72/14* (2013.01); *H04W 76/11* (2018.02); *H04W 76/19* (2018.02); *H04W 76/27* (2018.02)

(58) Field of Classification Search
CPC ..... H04W 68/02; H04W 76/27; H04W 76/11; H04W 76/19; H04W 72/14
(Continued)

(56) References Cited

U.S. PATENT DOCUMENTS

2002/0177443 A1* 11/2002 Tokuyoshi ............ H04W 64/00
455/435.1
2015/0341857 A1 11/2015 Uchino et al.
(Continued)

FOREIGN PATENT DOCUMENTS

CN 104349419 A 2/2015
CN 104885557 A 9/2015
(Continued)

OTHER PUBLICATIONS

Australian First Examination Report for EP Application 2017438131 dated Mar. 18, 2021. (5 pages).
(Continued)

*Primary Examiner* — Inder P Mehra
(74) *Attorney, Agent, or Firm* — Young Basile Hanlon & MacFarlane, P.C.

(57) ABSTRACT

Disclosed by the present disclosure are a context identification indication method, an acquisition method, a user equipment (UE), a base station and a computer storage medium. The method comprising: carrying, in an MSG3 message, part of UE context identification information and related information of identification information for a second base station; and sending the MSG3 message to a first base station.

10 Claims, 3 Drawing Sheets

(51) Int. Cl.
*H04W 76/11* (2018.01)
*H04W 76/19* (2018.01)
*H04W 72/14* (2009.01)

(58) Field of Classification Search
USPC ......................................................... 370/329
See application file for complete search history.

(56) References Cited

U.S. PATENT DOCUMENTS

| | | | | |
|---|---|---|---|---|
| 2015/0373584 A1* | 12/2015 | Hong | ................... | H04W 28/08 |
| | | | | 370/329 |
| 2017/0026297 A1* | 1/2017 | Sun | ....................... | H04L 1/0067 |
| 2019/0174421 A1* | 6/2019 | Quan | ................ | H04W 52/0274 |

FOREIGN PATENT DOCUMENTS

| | | | | |
|---|---|---|---|---|
| CN | 107046735 | * | 8/2017 | ........ H04W 74/0833 |
| CN | 107046735 A | | 8/2017 | |
| CN | 107135549 A | | 9/2017 | |
| CN | 107249221 A | | 10/2017 | |
| EP | 3413621 A1 | | 12/2018 | |
| EP | 3570584 A1 | | 11/2019 | |
| RU | 2464741 C1 | | 10/2012 | |
| WO | 2019029661 A1 | | 2/2019 | |

OTHER PUBLICATIONS

European Examination Report for EP Application 17930192.4 dated Feb. 1, 2021. (4 pages).
Russia Office Action with English Translation for RU Application 2020112754/07(021611) dated Oct. 26, 2020.
Extended European Search Report for EP Application 17930192.4 dated Jul. 7, 2020.
Australian Notice of Acceptance for Patent Application for AU Application 2017438131 dated May 10, 2021. (3 pages).
Canadian Examination Report for CA Application 3076844 dated May 13, 2021. (4 pages).
Indian Examination Report for IN Application 202017020070 dated Jun. 4, 2021. (6 pages).
Russian Decision on grant a patent for invention with English Translation for RU Application 2020112754 dated May 11, 2021. (14 pages).
Korean First Office Action and English Translation for Korean Application No. 10-2020-7009089 dated Aug. 9, 2021.

* cited by examiner

INDICATION METHOD FOR CONTEXT IDENTIFICATION, ACQUISITION METHOD, USER EQUIPMENT AND BASE STATION

CROSS-REFERENCE TO RELATED APPLICATION(S)

This application is a 371 application of International Application No. PCT/CN2017/108648, filed on Oct. 31, 2017, the entire disclosure of which is hereby incorporated by reference.

TECHNICAL FIELD

The present disclosure relates to the technical field of information processing, in particular to a context identification indication method, a context identification acquisition method, a User Equipment (UE), a base station and a computer storage medium.

BACKGROUND

At present, with people's pursuit of speed, delay, high-speed mobility, energy efficiency and diversity and complexity of services in the future life, the 3rd Generation Partnership Project (3GPP) International Organization for Standard has begun to research and develop the 5th-generation (5G) communication. In order to reduce air interface signaling, quickly resume a wireless connection and quickly resume a data service in a 5G network environment, a new Radio Resource Control (RRC) state, i.e. an RRC_INACTIVE state, is defined. This state is different from an RRC IDLE state and an RRC ACTIVE state. When a network side commands a UE to enter the RRC_INACTIVE state, the network side will allocate an identification to the UE, and the identification is used for identifying a context of the UE and used for addressing a gNB which stores the context of the UE, and meanwhile, the network side will configure information, such as the identification and a paging area, etc., to the UE. When the UE resumes a connection, an MSG3 message is sent to the network side, and the message carries the UE context identification to inform the network side to acquire the context and address the gNB which stores the context.

However, currently a size of the MSG3 message is designed according to 48 bits, if identification of the UE context is still designed according to 40 bits, the size of the MSG3 will become larger, so a base station needs to always allocate a size of 80 bits for a grant in MSG2 to allocate a UL grant (which is traditionally 56 bits). It can be seen that in the prior art, signaling load of the MSG3 cannot be reduced and resources will be wasted to some extent.

SUMMARY

In order to solve the above technical problems, implementations of the present disclosure provide a context identification indication method, a context identification acquisition method, a User Equipment (UE), a base station and a computer storage medium.

An implementation of the present disclosure provides a context identification indication method, applied to a User Equipment (UE). The method includes: carrying part of UE context identification information and related information of identification information for a second base station in an MSG3 message; and sending the MSG3 message to a first base station.

An implementation of the present disclosure provides a context identification acquisition method, applied to a first base station. The method includes: receiving an MSG3 message sent from a User Equipment (UE); and from the MSG3 message, acquiring part of UE context identification information and related information of identification information for a second base station.

An implementation of the present disclosure also provides a User Equipment (UE), including: a first processing unit, configured to carry part of UE context identification information and related information of identification information for a second base station in an MSG3 message; and a first communication unit, configured to send the MSG3 message to a first base station.

An implementation of the present disclosure also provides a base station, including: a second communication unit, configured to receive an MSG3 message sent from a User Equipment (UE); and a second processing unit, configured to acquire part of UE context identification information and related information of identification information for a second base station from the MSG3 message.

An implementation of the present disclosure also provides a User Equipment (UE), including a processor and a memory configured to store a computer program which is capable of being run on the processor, wherein the processor is configured to execute the acts of the above method when running the computer program.

An implementation of the present disclosure also provides a base station, including a processor and a memory configured to store a computer program which is capable of being run on the processor, wherein the processor is configured to execute the acts of the above method when running the computer program.

An implementation of the present disclosure also provides a computer storage medium, wherein the computer storage medium stores computer-executable instructions, and when the computer-executable instructions are executed, the acts of the above method are implemented.

DETAILED DESCRIPTION

To understand features and technical contents of implementations of the present disclosure in more detail, the implementation of the implementations of the present disclosure will be described in detail below with reference to the drawings, which are used for reference only and are not intended to limit the implementations of the present disclosure.

Implementation One

Figure 1:
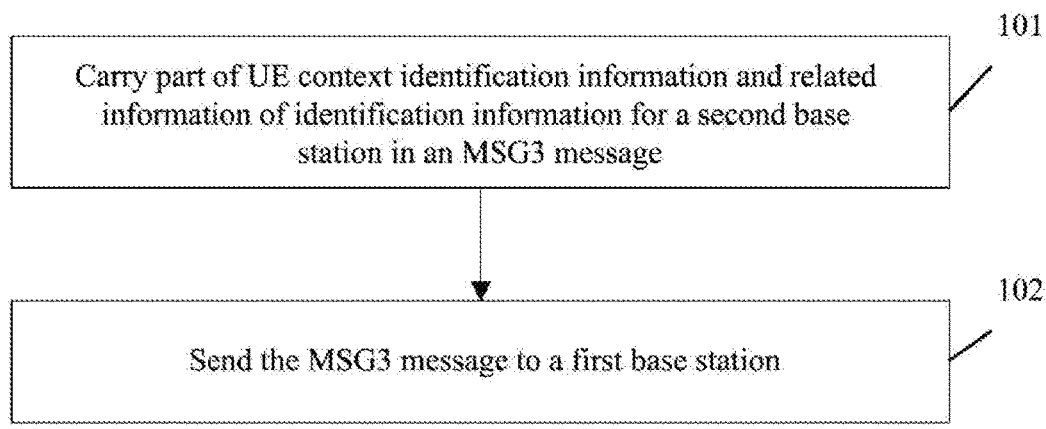
FIG. 1 is a schematic flowchart of a context identification indication method according to an implementation of the present disclosure.

The implementation of the present disclosure provides a context identification indication method, which is applied to a UE. As shown in FIG. 1, the method includes act 101 and act 102.

In act 101, the UE carries part of UE context identification information and related information of identification information for a second base station in an MSG3 message.

In act 102, the UE sends the MSG3 message to a first base station.

Herein, the UE may be a device that is capable of accessing a mobile communication network, such as a smart phone, or a tablet computer.

Before the act 101 is performed, that is, before the UE carries the part of the UE context identification information and the related information of the identification information for the second base station in the MSG3 message, the method further includes: the UE acquires a difference value between the identification information of the second base station and identification information of the first base station, and determines whether the difference value is greater than a preset value.

Specifically, after determining whether the difference value is greater than the preset value, the UE uses the difference value between the identification information of the second base station and the identification information of the first base station and a size relation between the identification information of the second base station and the indication information of the first base station as the related information of the identification information for the second base station when the difference value is not greater than the preset value.

Herein, the first base station may be understood as a base station where the UE is currently located, that is, a base station currently serving the UE; and the second base station is a base station recorded in the UE context information.

That is, when the difference value between the identification information of the current base station and the identification information of the recorded base station is less than a certain value, all information can be set in the MSG3, and at this case, the difference value and its corresponding relationship may all be carried in the MSG3.

Herein, the preset value may be set according to an actual situation, and specifically it is related to a length of data bits that can be set. If there are 4 bits in the data bits used for representing the difference value, then the preset value may be set to 16, that is, if the 16 is exceeded, there must be 5 bits or more than 5 bits used for representing the difference value.

Specifically, after whether the difference value is greater than the preset value is determined, when the difference value is greater than the preset value, position indication information of the identification information for the second base station is used as the related information of the identification information for the second base station. The position indication information of the identification information for the second base station is at least used for indicating that the identification information for the second base station is sent in MSG5.

In this scenario, that is to say, the part of UE context identification information and/or the identification information of the second base station may be sent in the MSG5. Specifically, the US carries the identification information for the second base station and/or the part of UE context identification information in the MSG5 to be sent, and sends the MSG5 to the first base station.

It can be seen that the UE indicates the part of context information and related information of identification information for the second base station in the MSG3, so that a current base station can acquire complete context information of the UE, and then acquire context and address a base station which stores the context, which is beneficial for RRC connection resume, and purposes of reducing signaling load and avoiding waste of resources are achieved.

Implementation Two

Figure 2:
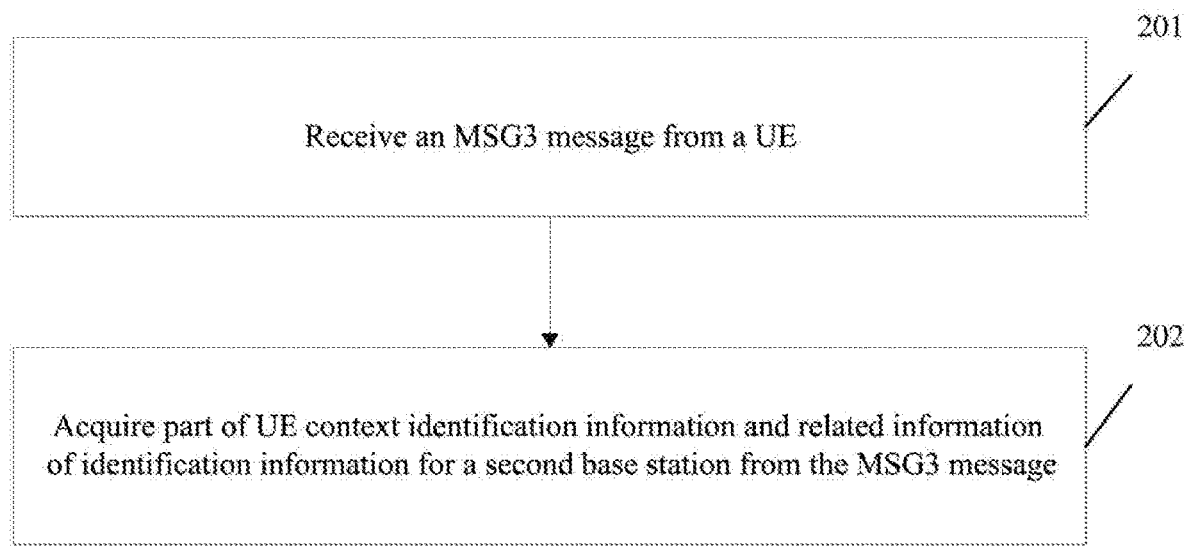
FIG. 2 is a schematic flow chart of a context identification acquisition method according to an implementation of the present disclosure.

An implementation of the present disclosure provides a context identification acquisition method, which is applied to a first base station. As shown in FIG. 2, the method includes act 201 and act 202.

In act 201, a first base station receives an MSG3 message from a UE.

In act 202, the first base station acquires part of UE context identification information and related information of identification information for a second base station from the MSG3 message.

Herein, the UE may be a device that is capable of accessing a mobile communication network, such as a smart phone, or a tablet computer.

Corresponding to the two modes of setting the related information of the identification information for the second base station provided by Implementation one, the present implementation also has multiple analysis modes.

A first mode is a processing mode with regard to containing a difference value and a size relation in the MSG3.

Acquiring, by the first base station, the part of UE context identification information and the related information of identification information for the second base station from the MSG3 message, includes: the first base station acquires the part of UE context identification information, a difference value between the identification information of the second base station and identification information of the first base station, and a size relation between the identification information of the second base station and the identification information of the first base station from the MSG3 message; and determines the identification information of the second base station based on the part of UE context identification information, the difference value between the identification information of the second base station and the identification information of the first base station, and the size relation between the identification information of the second base station and the identification of the first base station.

Herein, the first base station may be understood as a base station where the UE is currently located, that is, a base station currently serving the UE; and the second base station is a base station recorded in the UE context information.

That is, when the difference value between the identification information of the current base station and the identification information of the recorded base station is less than a certain value, all information can be set in the MSG3, and at this case, the difference value and the corresponding relation may all be carried in the MSG3.

Herein, the preset value may be set according to an actual situation, and specifically it is related to a length of data bits that can be set. If there are 4 bits in the data bits used for representing the difference value, then the preset value may be set to 16, that is, if the 16 is exceeded, there must be 5 bits or more than 5 bit used for representing the difference value.

In a second mode, indication information is acquired from the MSG3, and then specific identification information is acquired from an MSG5.

Specifically, after whether the difference value is greater than the preset value is determined, when the difference value is greater than the preset value, position indication information of the identification information for the second base station is used as the related information of the identification information for the second base station; wherein the position indication information of the identification information for the second base station is at least used for indicating that the identification information for the second base station is sent in the MSG5.

From the MSG3 message, the part of UE context identification information and the position indication information of the identification information for the second base station are acquired; wherein the position indication information of the identification information for the second base station is at least used for indicating that the identification information for the second base station is sent in the MSG5.

In this scenario, that is to say, the part of UE context identification information and/or the identification information of the second base station may be carried in the MSG5 to be sent. Specifically, the identification information for the second base station and/or the part of UE context identification information are carried in the MSG5; and the MSG5 is sent to the first base station. Correspondingly, on the base station side, after receiving the MSG3 message sent from the UE, the method further includes: acquiring the identification information for the second base station and/or the part of UE context identification information from the MSG5.

After the identification information of the second base station is acquired, the method further includes: acquiring UE context information based on the identification information of the second base station.

Figure 3:
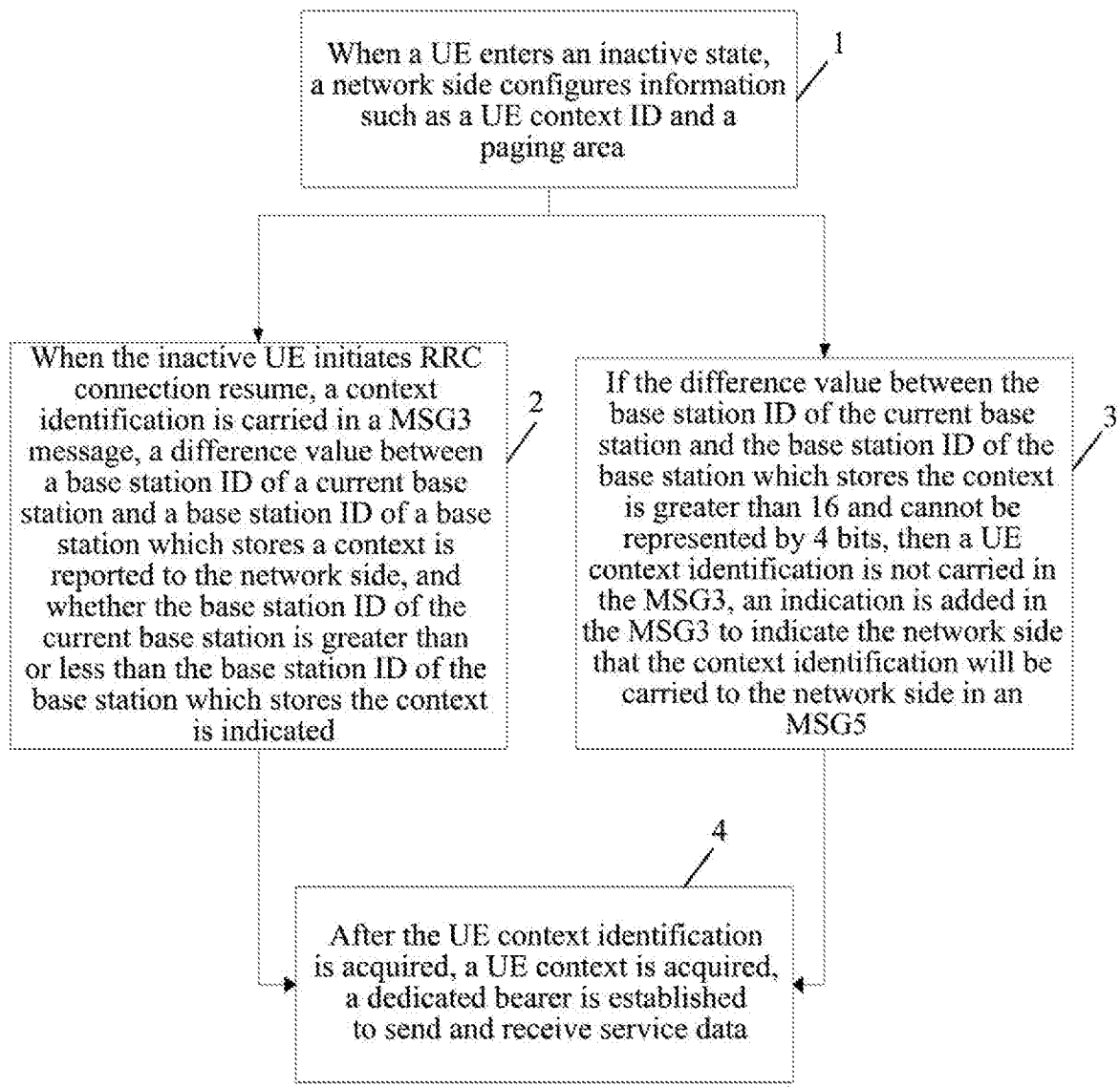
FIG. 3 is a schematic diagram of an overall processing flow according to an implementation of the present disclosure.

The present implementation provides a specific real-time flow in conjunction with FIG. 3. Firstly, a UE context ID is designed without considering limit for a size of the MSG3, for example, the UE context ID is still 40 bits, 20 bits of a base station ID plus 20 bits of a context ID, and then the following processing is performed.

1. When the UE enters an inactive state, the network side configures information such as a UE context ID and a paging area.

2. When the inactive UE initiates RRC connection resume, a context identification is carried in an MSG3 message, such as the 20 bits in act 1, and a difference value between a base station ID of a current base station and a base station ID of a base station which stores a context is reported to the network side, for example, the difference value is represented by 4 bits in the MSG3. At the same time, it is indicated whether the base station ID of the current base station is greater than or less than the base station ID of the base station which stores the context.

3. If the difference value between the base station ID of the current base station and the base station ID of the base station which stores the context is greater than 16, and the difference value cannot be represented by 4 bits, then the UE context identification is not carried in the MSG3, but an indication is added in the MSG3 to indicate the network side that the context identification will be carried to the network side in an MSG5.

4. After the UE context identification is acquired, the UE context is acquired, and a dedicated bearer is established to send and receive service data.

It can be seen that the UE indicates part of context information and related information of identification information for a second base station in an MSG3, so that a current base station can acquire complete context information of the UE, and then acquire context and address a base station which stores the context, which is beneficial for RRC connection resume, and purposes of reducing signaling load and avoiding waste of resources are achieved.

Implementation 3

Figure 4:
FIG. 4 is a schematic diagram of structure of a UE according to an implementation of the present disclosure.

An implementation of the present disclosure provides a UE. As shown in FIG. 4, the UE includes a first processing unit 41 and a first communication unit 42.

The first processing unit 41 is configured to carry part of UE context identification information and related information of identification information for a second base station in an MSG3 message; and the first communication unit 42 is configured to send the MSG3 message to a first base station.

Herein, the UE may be a device that is capable of accessing a mobile communication network, such as a smart phone, or a tablet computer.

That is, before carrying the part of UE context identification information and the related information of the identification information for the second base station in the MSG3 message, the first processing unit 41 is configured to acquires a difference value between the identification information of the second base station and identification information of the first base station; and determine whether the difference value is greater than a preset value.

Specifically, after whether the difference value is greater than the preset value is determined, the difference value between the identification information of the second base station and the identification information of the first base station and a size relation between the identification information of the second base station and the identification information of the first base station are used as the related information of the identification information for the second base station when the difference value is not greater than the preset value.

Herein, the first base station may be understood as a base station where the UE is currently located, that is, a base station currently serving the UE; and the second base station is a base station recorded in the UE context information.

That is, when the difference value between identification information of the current base station and the identification information of the recorded base station is less than a certain value, all information may be set in the MSG3, and at this case, the difference value and the corresponding relation may all be carried in the MSG3.

Herein, the preset value may be set according to an actual situation, and specifically it is related to a length of data bits that can be set. If there are 4 bits in the data bits used for representing the difference value, then the preset value may be set to 16, that is, if the 16 is exceeded, there must be 5 bits or more than 5 bits used for representing the difference value.

Specifically, after determining whether the difference value is greater than the preset value, the first processing unit 41 is configured to, when the difference value is greater than the preset value, use position indication information of the identification information for the second base station as the related information of the identification information for the second base station; wherein the position indication information of the identification information for the second base station is at least used for indicating that the identification information for the second base station is sent in an MSG5.

In this scenario, that is to say, the part of UE context identification information and/or the identification information of the second base station may be carried in the MSG5 to be sent, specifically, the identification information for the second base station and/or the part of UE context identification information are carried in the MSG5; and the MSG5 is sent to the first base station.

It can be seen that the UE indicates context information and related information of identification information for a second base station in the MSG3, so that a current base station can acquire complete context information of the UE, and then acquire context and address a base station which stores the context, which is beneficial for RRC connection resume, and purposes of reducing signaling load and avoiding waste of resources are achieved.

Implementation Four

Figure 5:
FIG. 5 is a schematic diagram of structure of a base station according to an implementation of the present disclosure.

An implementation of the present disclosure provides a base station. As shown in FIG. 5, the base station includes a second communication unit 51 and a second processing unit 52.

The second communication unit 51 is configured to receive an MSG3 message from a UE; and the second processing unit 52 is configured to acquire, from the MSG3 message, part of UE context identification information and related information of identification information for a second base station.

Herein, the UE may be a device that is capable of accessing a mobile communication network, such as a smart phone, or a tablet computer.

Corresponding to the two modes of setting the related information of the identification information for the second base station provided by Implementation one, the present implementation also has multiple analysis modes.

A first mode is a processing mode with regard to containing the difference value and a size relation in the MSG3.

The second processing unit 52 is configured to acquire, from the MSG3 message, the part of UE context identification information, a difference value between the identification information of the second base station and identification information of the first base station, and a size relation between the identification information of the second base station and the identification information of the first base station; and based on the part of UE context identification information, the difference value between the identification information of the second base station and the identification information of the first base station, and the size relation between the identification information of the second base station and the identification of the first base station, determine the identification information of the second base station.

Herein, the first base station may be understood as a base station where the UE is currently located, that is, a base station currently serving the UE; and the second base station is a base station recorded in the UE context information.

That is, when the difference value between identification information of the current base station and the identification information of the recorded base station is less than a certain value, all information can be set in MSG3, and at this case, the difference value and the corresponding relation may all be carried in the MSG3.

Herein, the preset value may be set according to an actual situation, and specifically it is related to a length of data bits that can be set. If there are 4 bits in the data bits used for representing the difference value, then the preset value may be set to 16, that is, if the 16 is exceeded, there must be 5 bits or more the 5 bit used for representing the difference value.

In a second mode, indication information is acquired from the MSG3, and then specific identification information is acquired from an MSG5.

Specifically, after whether the difference value is greater than the preset value is determined, when the difference value is greater than the preset value, position indication information of the identification information for the second base station is used as the related information of the identification information for the second base station; wherein the position indication information of the identification information for the second base station is at least used for indicating that the identification information for the second base station is sent in the MSG5.

The second processing unit 52 is configured to acquire, from the MSG3 message, the part of UE context identification information and the position indication information of the identification information for the second base station; wherein the position indication information of the identification information for the second base station is at least used for indicating that the identification information for the second base station is sent in the MSG5.

In this scenario, that is to say, the part of UE context identification information and/or the identification information of the second base station may be carried in the MSG5 to be sent, specifically, in the MSG5, the identification information for the second base station and/or the part of UE context identification information are carried; and the MSG5 is sent to the first base station. Correspondingly, on the base station side: after receiving the MSG3 message sent from the UE, the second processing unit 52 is further configured to: acquire the identification information for the second base station and/or the part of UE context identification information from in the MSG5.

After the identification information of the second base station is acquired, the second processing unit 52 is further configured to based on the identification information of the second base station, acquire context information of the UE.

It can be seen that the UE indicates part of context information and related information of identification information for a second base station in an MSG3, so that a current base station can acquire complete context information of the UE, and then acquire context and address a base station which stores the context, which is beneficial for RRC connection resume, and purposes of reducing signaling load and avoiding waste of resources are achieved.

Figure 6:
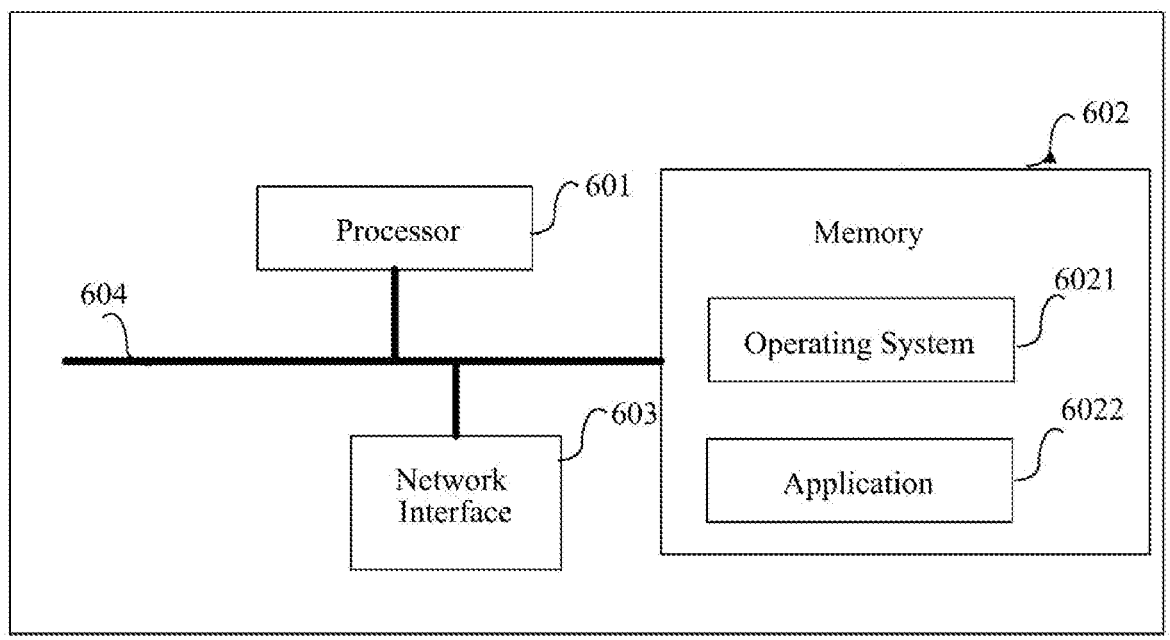
FIG. 6 is a schematic diagram of architecture of hardware according to an implementation of the present disclosure.

An implementation of the present disclosure also provides architecture of hardware components of a UE, or a base station. As shown in FIG. 6, the architecture includes at least one processor 601, a memory 602, and at least one network interface 603. The various components are coupled together through a bus system 604. It may be understood that the bus system 604 is used for implementing connection and communication between these components. In addition to the data bus, the bus system 604 further includes a power bus, a control bus, and a status signal bus. However, for clarity, all kinds of buses are uniformly referred to as the bus system 604 in the FIG. 6.

It may be understood that the memory 602 in the implementations of the present disclosure may be a volatile memory or a non-volatile memory, or it may include both volatile and non-volatile memory.

In some corresponding modes, the memory 602 stores following elements, executable modules or data structures, or subsets thereof, or extended sets thereof: an operating system 6021 and an application 6022.

Herein, the processor 601 is configured to be capable of executing all the acts of the method in the first implementation or the second implementation, which will not be repeated here.

An implementation of the present disclosure provides a computer storage medium, wherein the computer storage medium stores computer-executable instructions, and when the computer-executable instructions are executed, the acts of the method in the above first implementation or the above second implementation are implemented, which will not be repeated here.

The above device in the implementations of the present disclosure may also be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions for causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and another media capable of storing program codes. Thus, the implementations of the present disclosure are not limited to any specific combination of hardware and software.

Correspondingly, an implementation of the present disclosure also provides a computer storage medium in which a computer program is stored, and the computer program is configured to execute the data scheduling method in the implementations of the present disclosure.

Although preferred implementations of the present disclosure have been disclosed for illustrative purposes, those skilled in the art will recognize that various modifications, additions and substitutions are also possible, and therefore, the scope of the present disclosure should not be limited to the above implementations.

What we claim is:

1. A method of context identification indication, applied to a User Equipment (UE), and the method comprising:
    acquiring a difference value between identification information of a second base station and identification information of a first base station;
    determining whether the difference value is greater than a preset value;
    when the difference value is not greater than the preset value, using the difference value between the identification information of the second base station and the identification information of the first base station and a size relation between the identification information of the second base station and the identification information of the first base station as related information of the identification information pertaining to the second base station;
    when the difference value is greater than the preset value, using position indication information of the identification information pertaining to the second base station as the related information, wherein the position indication information of the identification information pertaining to the second base station is at least used for indicating that the identification information pertaining to the second base station is sent in a message 5 (MSG5);
    carrying part of UE context identification information and the related information of identification information pertaining to the second base station in a message 3 (MSG3) message; and
    sending the MSG3 message to the first base station.

2. The method according to claim 1, wherein after sending the MSG3 message to the first base station, the method further comprises:
    carrying the identification information and/or the part of UE context identification information in the MSG5; and
    sending the MSG5 to the first base station.

3. A method of context identification acquisition, applied to a first base station, and the method comprising:
    receiving a message 3 (MSG3) message sent from a User Equipment (UE); and
    acquiring part of UE context identification information and related information of identification information from the MSG3 message, wherein the identification information is identification information pertaining to a second base station, and the related information comprises a difference value between the identification information of the second base station and identification information of the first base station,
    wherein acquiring the part of UE context identification information and the related information of the identification information from the MSG3 message, comprises:
        acquiring the part of UE context identification information, a difference value between the identification information of the second base station and identification information of the first base station, and a size relation between the identification information of the second base station and the identification information of the first base station from the MSG3; and determining the identification information of the second base station based on the part of UE context identification information, the difference value between the identification information of the second base station and the identification information of the first base station, and the size relation between the identification information of the second base station and the identification of the first base station; or
        acquiring the part of UE context identification information and position indication information of the identification information pertaining to the second base station from the MSG3 message, wherein the position indication information of the identification information pertaining to the second base station is at least used for indicating that the identification information pertaining to the second base station is sent in a message 5 (MSG5).

4. The method according to claim 3, wherein after receiving the MSG3 message sent from the UE, the method further comprises:
    acquiring the identification information for the second base station and/or the part of UE context identification information from the MSG5.

5. The method according to claim 3, wherein after acquiring the identification information of the second base station, the method further comprises:
    acquiring UE context information based on the identification information of the second base station.

6. A User Equipment (UE), comprising: a memory, a processor and a network interface;
    wherein the memory is configured to store a computer program that is capable of being run on the processor; and
    wherein the processor is configured to, when the computer program is running:
        acquire a difference value between the identification information of a second base station and identification information of a first base station; and determine whether the difference value is greater than a preset value, when the difference value is not greater than the preset value, use the difference value between the identification information of the second base station and the identification information of the first base station and a size relation between the identification information of the second base station and the identification information of the first base station as related information of the identification information of the second base station;

when the difference value is greater than the preset value, use position indication information of the identification information pertaining to the second base station as the related information of the identification information of the second base station, wherein the position indication information of the identification information pertaining to the second base station is at least used for indicating that the identification information pertaining to the second base station is sent in a message 5 (MSG5);

carry part of UE context identification information and the related information of identification information pertaining to the second base station in a message 3 (MSG3) message; and send the MSG3 message to the first base station through the network interface.

7. The UE according to claim 6, wherein the processor is configured to carry the identification information pertaining to the second base station and/or the part of UE context identification information in the MSG5; and send the MSG5 to the first base station through the network interface.

8. A base station, comprising: a memory, a processor and a network interface;

wherein the memory is configured to store a computer program that is capable of being run on the processor; and wherein the processor is configured to, when the computer program is running:

receive a message 3 (MSG3) message sent from a User Equipment (UE) through the network interface; and acquire part of UE context identification information and related information of identification information from the MSG3 message, wherein the identification information is identification information pertaining to a second base station, and the related information comprises a difference value between the identification information of the second base station and identification information of a first base station; and at least one of:

wherein the related information of identification information comprises a difference value between the identification information of the second base station and identification information of the first base station, and a size relation between the identification information of the second base station and the identification information of the first base station from the MSG3 message; and determine the identification information of the second base station based on the part of UE context identification information, the difference value between the identification information of the second base station and the identification information of the first base station, and the size relation between the identification information of the second base station and the identification of the first base station; or wherein the related information of identification information comprises position indication information of the identification information pertaining to the second base station from the MSG3 message; and wherein the position indication information of the identification information pertaining to the second base station is at least used for indicating that the identification information pertaining to the second base station is sent in a message 5 (MSG5).

9. The base station according to claim 8, wherein the processor is configured to acquire the identification information for the second base station and/or the part of UE context identification information from the MSG5.

10. The base station according to claim 8, wherein the processor is configured to acquire UE context information based on the identification information of the second base station.

* * * * *